US005467428A

United States Patent [19]

Ulug

[11] Patent Number: 5,467,428
[45] Date of Patent: Nov. 14, 1995

[54] ARTIFICIAL NEURAL NETWORK METHOD AND ARCHITECTURE ADAPTIVE SIGNAL FILTERING

[76] Inventor: Mehmet E. Ulug, 1537 E. Hillsboro Blvd. #342, Deerfield Beach, Fla. 33441

[21] Appl. No.: 290,672

[22] Filed: Aug. 15, 1994

Related U.S. Application Data

[63] Continuation of Ser. No. 793,850, Nov. 18, 1991, abandoned, which is a continuation-in-part of Ser. No. 710,961, Jun. 6, 1991, abandoned.

[51] Int. Cl.$^6$ .................................................. G06F 15/18
[52] U.S. Cl. .............................. 395/23; 395/21; 395/24; 395/27
[58] Field of Search .............................. 395/22–25, 27, 395/927, 929; 382/15

[56] References Cited

U.S. PATENT DOCUMENTS

| | | | |
|---|---|---|---|
| 4,317,197 | 2/1982 | Ulug | 370/94 |
| 4,858,147 | 8/1989 | Conwell | 364/513 |
| 4,906,940 | 3/1990 | Greene et al. | 382/16 |
| 4,912,652 | 3/1990 | Wood | 364/513 |
| 4,918,620 | 4/1990 | Ulug | 364/513 |
| 4,933,872 | 6/1990 | Vandenberg et al. | 395/22 |
| 4,941,122 | 7/1990 | Weideman | 364/807 |
| 4,951,239 | 8/1990 | Andes et al. | 395/23 |
| 4,962,342 | 10/1990 | Mead et al. | 395/24 |
| 4,965,443 | 10/1990 | Yamasaki et al. | 395/11 |
| 4,979,126 | 12/1990 | Pao et al. | 395/24 |
| 5,067,095 | 11/1991 | Peterson et al. | 395/24 |
| 5,073,867 | 12/1991 | Murphy et al. | 395/27 |
| 5,101,361 | 3/1992 | Eberhardt | 395/24 |
| 5,103,496 | 4/1992 | Andes et al. | 395/24 |
| 5,120,996 | 6/1992 | Mead et al. | 395/24 |
| 5,150,450 | 9/1992 | Swenson et al. | 395/21 |
| 5,155,802 | 10/1992 | Mueller et al. | 395/24 |
| 5,181,171 | 1/1993 | McCormack et al. | 395/929 |
| 5,187,680 | 2/1993 | Engear | 395/24 |
| 5,195,169 | 3/1993 | Kamiya et al. | 395/23 |
| 5,204,938 | 4/1993 | Skapura et al. | 395/27 |

FOREIGN PATENT DOCUMENTS

| | | |
|---|---|---|
| 2177825 | 1/1987 | United Kingdom. |
| 2234372 | 1/1991 | United Kingdom. |

OTHER PUBLICATIONS

Qian et al; "Function approximation with an Orthogonal Basis Net"; IJCNN, Jun. 1990, III–605 to III–619.
Bailey et al "Why VLSI Implementations of Associative VLCN, Require Connection multiplexing"; IEEE, 1988 112–119.

(List continued on next page.)

Primary Examiner—David K. Moore
Assistant Examiner—Tariq Hafiz
Attorney, Agent, or Firm—Malin, Haley, DiMaggio & Crosby

[57] ABSTRACT

An architecture and data processing method for a neural network that can approximate any mapping function between the input and output vectors without the use of hidden layers. The data processing is done at the sibling nodes (second row). It is based on the orthogonal expansion of the functions that map the input vector to the output vector. Because the nodes of the second row are simply data processing stations, they remain passive during training. As a result the system is basically a single-layer linear network with a filter at its entrance. Because of this it is free from the problems of local minima. The invention also includes a method that reduces the sum of the square of errors over all the output nodes to zero (0.000000) in fewer than ten cycles. This is done by initialization of the synaptic links with the coefficients of the orthogonal expansion. This feature makes it possible to design a computer chip which can perform the training process in real time. Similarly, the ability to train in real time allows the system to retrain itself and improve its performance while executing its normal testing functions. Because the second synaptic link values represent the frequency spectrum of the signal appearing on a given output node, by training the ONN with all N sibling nodes and using only some of them in testing, we can create a low pass, a high pass or a band pass filter.

11 Claims, 4 Drawing Sheets

OTHER PUBLICATIONS

Rumelhart et al., "Learning Internal Representations by Error Propagation," Parallel Distributed Processing, vol. 1, Foundations, Rumelhart and McClelland, eds, MIT Press, Cambridge, Mass. (1986), pp. 318–362.

Thro, Ellen, "The Artificial Intelligence Dictionary", 1991, p. 148. Microtrend Books.

Le Cun et al., "Optical Character Recognition and Neural–Net Chips," International Neural Network Conference, Jul. 1990, pp. 651–655.

Omatu et al., "Neural Network Model for Alphabetical Letter Recognition," International Neural Network Conference, Jul. 1990, pp. 19–22.

Sharaf et al, "Transient stability and critical clearing time classification using neural networks"; APSCO–93, p. 365–372 vol. 1, 7–10 Dec. 1993.

Floyd et al, "Artificial neural networks for SPECT image reconstruction with optimized weighted backpropagation"; Conference record of the 1991 IEEE Nuclear Science Symposium and Medical Imaging Conference, pp. 2184–2188 vol. 3, 2–9 Nov. 1991.

Upadhyaya et al, "Development and application of neural network alogrithms for process diagnostics"; Proceedigns of the 29th IEEE Conference on Decision and Control, pp. 3277–3282 vol. 6, 5–7 Dec. 1990.

ARTIFICIAL NEURAL NETWORK METHOD AND ARCHITECTURE ADAPTIVE SIGNAL FILTERING

This application is a continuation of U.S. application Ser. No. 07/793,850filed Nov. 18, 1991, now abandoned, which was a continuation-in-part of U.S. application Ser. No. 07/710,961, filed Jun. 6, 1991, now abandoned.

The present invention is directed in general to Artificial Neural Networks and, more particularly, to a neural network architecture and corresponding method of operation

BACKGROUND OF THE INVENTION

Computers can store, modify, and retrieve large amounts of data much more quickly than humans. They are also much more accurate and precise in their computations and less prone to error than most conscientious human beings. However, computers can not cope with many of the simple tasks that humans perform every day. In particular, they completely fail in generalizing and guessing. Also they have great difficulty working with either partial or noisy information. For this reason scientist have designed parallel distributed processors that consist of a vast network of parallel distributed processors that consist of a vast network of neuron-like units. These systems are called Artificial Neural Networks. Although they could be built in hardware, typically they are simulated on powerful conventional computers.

The simplest neural network contains an input layer and an output layer. Each layer consists of a row of neuron-like units, or nodes. Each node in the output layer is connected to every node in the input layer through synaptic links. The conductivities of these links are called "weights". In such a network the signal at an output node is computed by summing up the product of each input signal with the weight of the corresponding synaptic link connecting to this output node. The output signals, called "activations", are then compared with the "target" values (desired signals) assigned to these nodes. A portion of the error, i.e.; the difference between the signal of an output node and the target value assigned to this output node, is used to change the weights in order to reduce the error. The most commonly used method of error minimization is called the "delta rule".

In effect, a neural network generates its output vector (a collection of activations of the output nodes) from an input vector (a collection of input signals) and compares the output vector with the target vector (a collection of desired outputs). This process is called "learning". If the output and target vectors are identical, no learning takes place. Otherwise the weights are changed to reduce the error. A neural network learns a mapping function between the input and target vectors by repeatedly observing patterns from a training set and modifying the weights of its synaptic links. Each pass through the training set is called a "cycle". Typically, a learning process (also called training) consists of many thousands of cycles and takes from several minutes to several hours to execute on a digital computer.

What is described above is the well known learning paradigm called "pattern association". In this paradigm the task is to associate a set of input patterns with an output pattern. A set of input patterns can be, for example, a number of curves that belong to the same class while differing from each other. Another learning paradigm is the "auto association" in which an input pattern is associated with itself. The goal here is pattern completion. When an incomplete pattern is presented, the auto association restores it to its original form. In both paradigms a teaching input in the form of repetitive presentations of a number of sets of input patterns associated with a number of output patterns is required. This is called "supervised learning".

It is found that the simple neural networks consisting of a row of input nodes and row of output nodes (also described as a "single-layer" network) cannot learn mappings that have very different outputs from very similar inputs. For example, they cannot learn based on the exclusive-or function. It is found that for the neural network to learn such arbitrary patterns, they must have more than two rows of nodes. In such "multi-layer" networks the rows between the input and output layers are called "hidden layers". The most commonly used multi-layer neural networks are known as the "backpropagation" systems. In these networks learning takes place by the propagation of error in the forward as well as the backward direction. This two way propagation of errors results in a complex learning process and further increases the training time. It was also discovered that linear networks cannot compute more in multiple layers than they can in a single layer. Because of this, in backpropagation networks nonlinearities are introduced at the hidden and output nodes using sigmoid functions.

In a single-layer linear network the error function is always smooth and the error surface is bowl-shaped. The delta rule mentioned above uses the "gradient descent" method. In this method the derivative of the error measure (sum of the squares of errors) with respect to each weight is proportional to the weight change with a negative constant of proportionality (proportion of the dictated weight change is called "learning rate"). This corresponds to performing the steepest descent on a surface in weight space. The height of the surface at any point is equal to the error measure. Because of this, the delta rule has no difficulty locating the minimum point of the bowl-shape error surface of a single-layer linear network. Multi-layer networks, however, can have more complex error surfaces with many minima. Only one of these is the "global minima" in which the system reaches an errorless state. The others are called "local minima". As a result, there is real possibility of a multi-layer network getting "stuck" in a local minima.

To reduce the training time, the learning rate is set as high as possible. However, this causes the error measure to oscillate. A "momentum term" is added to the weight change equation so that a high learning rate can be used while avoiding oscillations . The coefficient of the momentum term determines what portion of the previous weight change will be added to the current weight change.

In what follows, sets of patterns, features, curves, hyper surfaces and objects will be referred to as "patterns", and functions of the neural network such as identification, classification, detection, pattern association or auto association will be referred to as "identification".

A detailed description of artificial neural networks is provided in the reference entitled "Parallel Distributed Processing" by Rumelhart et al. (1986), Vol.1, the MIT Press, Cambridge, Mass.

During the evolution of artificial neural networks the following three problems have been discovered:

(i) Single-layer networks cannot learn mappings that have very different outputs from very similar inputs.

(ii) Linear networks cannot compute more in multiple layers than they can in a single layer.

(iii) Multilayer nonlinear networks that use the delta rule suffer from the problems of local minima.

It is a principal object of the present invention to provide a neural network architecture and operating method that is not subject to the aforementioned problems and disadvantages.

It is an additional object of the present invention to provide an architecture and operating method that enables a neural network to:

(i) map any input vector to any output vector without the use of hidden layers;

(ii) be free from the problems of local minima;

(iii) reduce the sum of the square of errors over the output nodes to 0.000000 in fewer than ten cycles.

While the specification concludes with claims defining the features of the invention that are regarded as novel, it is believed that the invention, together with further objects thereof, will be better understood from a consideration of the following description in conjunction with the drawing figures.

DESCRIPTION OF THE PREFERRED EMBODIMENT

This invention is comprised of the architecture and method of operation of a system called Orthogonal Neural Networks (abbreviated as ONN's).

Figure 1:
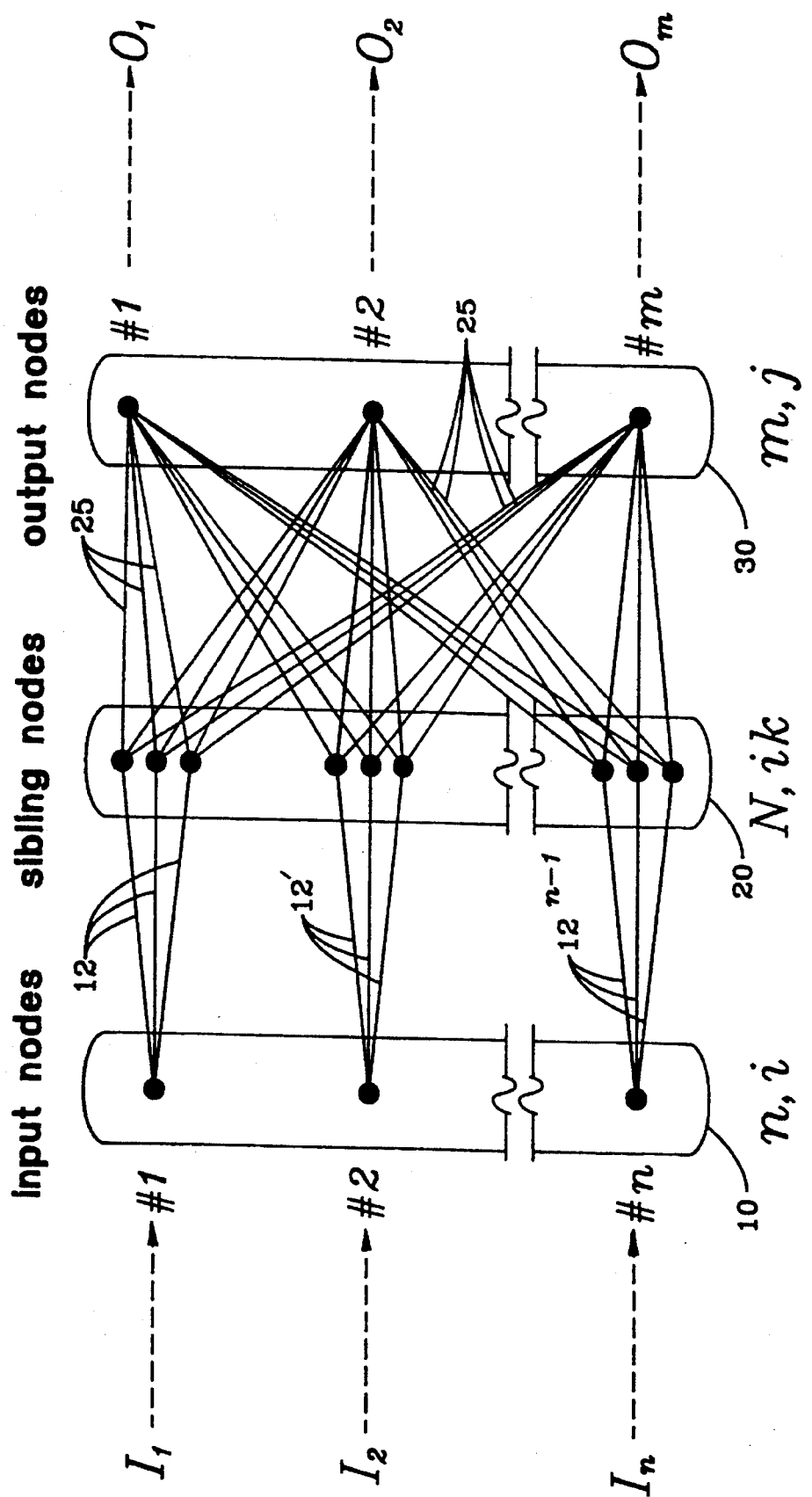
FIG. 1 is a diagrammatic illustration of the artificial neural network architecture of an embodiment of the present invention.

The architecture illustrated in FIG. 1 consists of three sets of nodes, input 10, sibling 20, and output nodes 30. The input nodes 10 and output nodes 30 are neuron-like units. The sibling nodes 20 are neural subsystems made up of many neurons. These nodes house special functions that carry out the orthogonal expansion of the mapping function between input and output vectors I and O, respectively. There are n input nodes 10. FIG. 1 shows the first, second and the n'th input node. Each input node 10 branches out into N sibling nodes 20 through a first synaptic link 12, 12', etc the conductivity, or weight, of which remains fixed at unity during the training process. Note that in FIG. 1, N=3. As a result of this branching out there are (n.N) sibling nodes. Also there are m output nodes. FIG. 1 shows the first, second and the m'th output node. Each output node 30 is connected to every sibling node through a second synaptic link 25, the conductivity, or weight, of which changes during the training process to reduce the difference between the actual and desired outputs at these output nodes 30.

Figure 2:
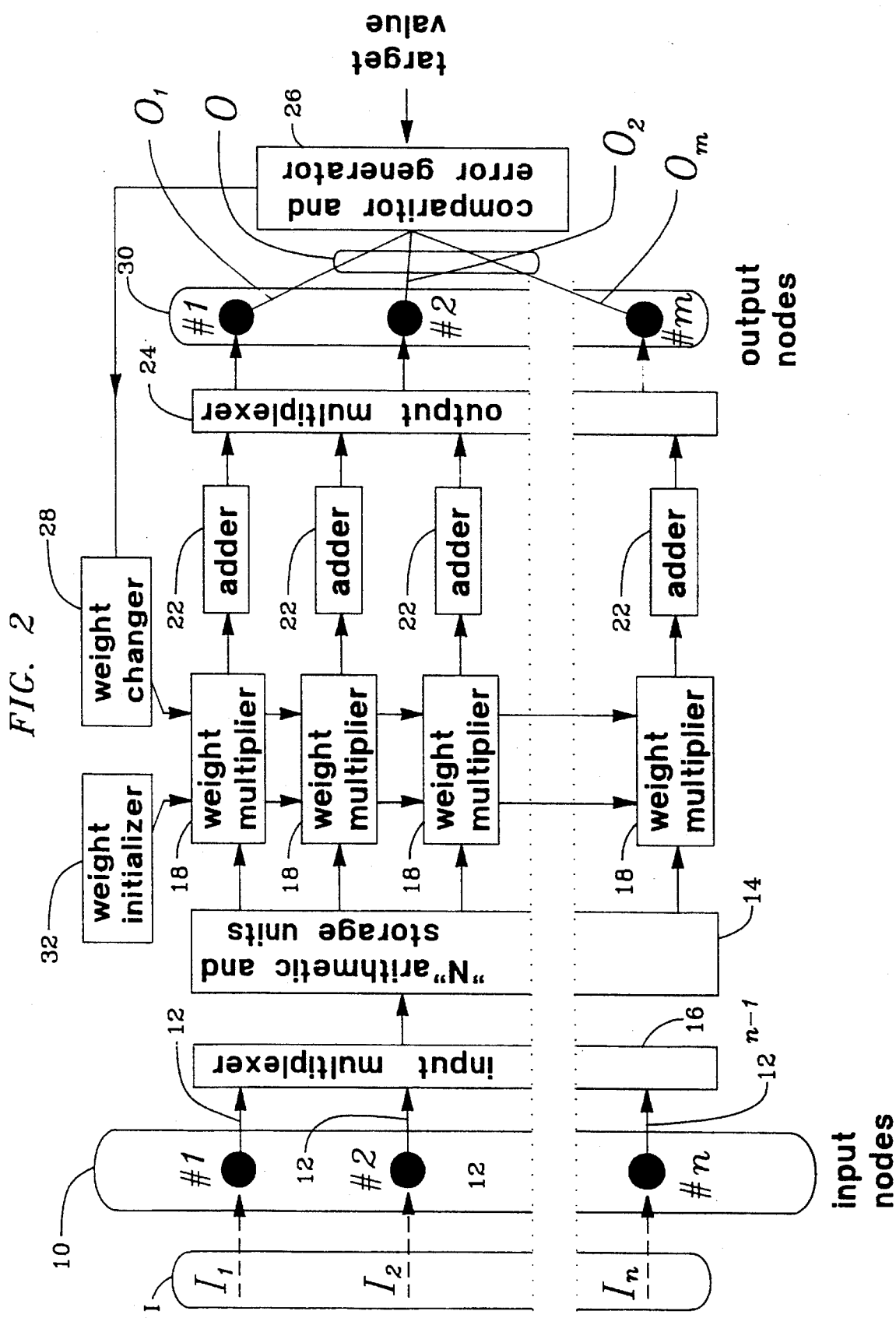
FIG. 2 is a block diagram illustrating the artificial neural network architecture of the invention to be implemented either on hardware or on a computer chip.

In FIG. 2, a subsystem comprising N arithmetic and N storage units 14, which correspond to sibling nodes 20 of FIG. 1, or which may be a single arithmetic and storage unit 14, is connected to input nodes 10 through a multiplexer unit 16. There are N outputs 12 through $12^{n-1}$ of the arithmetic units. These are connected to "N weight multipliers 18". The outputs of the weight multipliers are connected to the adder 22. The output of the adder 22 is connected through a multiplexer 24 to m output nodes 30. The output nodes are connected to a comparitor and error generator 26 where the activations are compared with the target values and an error signal is generated. The output of the comparitor is connected to a weight changer 28 that determines how much a particular weight is to be changed to minimize the error. The output of the weight changer is fed into the weight multiplier 18. Also a weight initializer unit 32 is connected to the weight multiplier 18 for the purposes of setting the initial values of the weights.

An ONN consists of three layers of nodes, input 10, sibling 20, and output 30. As shown in FIG. 1 each input node branches out into N sibling nodes. The sibling nodes are assumed to be neural subsystems made up of many neurons. In these nodes a set of either orthogonal functions or orthogonal polynomials are applied to the incoming data. This data processing is based on the orthogonal expansion of the mapping functions between input and output vectors. Because of this processing, the ONN can approximate any mapping function between the input and output vectors without the use of hidden layers.

In training, two different versions of the delta rule were used. In one version the target value of 0.5 was used for all output nodes. These nodes were, in effect, decoupled from each other. Using this approach it is quite easy to add another output node to the system while the system is in operation. In the other version of the delta rule that was used, each input vector was mapped to a different output vector. In both versions the sum of the squared errors over the output nodes became 0.000000 in fewer than ten cycles.

It is well known that if a single layer linear network is trained using the gradient descent procedure, its error surface is bowl-shaped. In the ONN the weight of the links between the input and sibling nodes remains fixed at unity. Because of this the sibling nodes can be regarded as data processing stations that do not actively participate in training. If one looks at the sibling nodes as a filter placed at the entrance, one can consider the ONN as a single layer linear neural network. In such networks the problems of local minima do not occur because the error surface has only one minimum. Note that the aforementioned filter does not change its input function, it just expresses it in an expanded form.

It has been discovered that in applications where the components of the input vector have equally spaced values, the initialization of the synaptic links with the coefficients of the orthogonal expansion results in a dramatic reduction of the training time. This technique and method, called Coefficient Initialization, is then extended to all applications using a general method. It is believed that a computer chip designed to implement this method in an ONN could result in real-time training.

The ONN has n input, m output, and (n.N) sibling nodes 20. Recall that each input node 10 branches out into N sibling nodes 20 as shown in FIG. 1. The index i for the input nodes 10 and the index j for the output nodes 30 is used. For the sibling nodes 20 the index is ik, where k varies from 1 to N and i is the index of the input nodes. Using this notation the operation of the ONN can be expressed as follows (vectors, bold lowercase letters; matrices, bold uppercase letters):

$$y = W_s s \quad (1)$$

where $W_s$ = weight matrix of connections between sibling and output nodes s = sibling vector y = output vector The components of the sibling vector s is given as follows:

$$S_{ik} = \phi_k(X_i) \tag{2}$$

where x = input vector $\phi_k$ = an orthogonal function that operates on the input vector N = number of sibling nodes used for each input node Because the ONN's use either orthogonal functions or orthogonal polynomials a brief background on orthogonal functions will now be provided. A detailed description of orthogonal functions is provided in the reference entitled "Theory and Problems of Advanced Calculus", Spiegel (1962), M. R., pp 301–320, McGraw-Hill Book Company, New York, N.Y.

Although we are discussing the orthogonal functions here, orthogonal polynomials or any other suitable method for expanding a function into a convergent series can be used.

Consider a set of functions $\phi_k(x)$ where k=1,2,3, ... having the property $$\int_a^b \phi_m(x) \cdot \phi_n(x) \cdot dx = 0 \tag{3}$$

for the values of m≠n in some interval (a,b).

In such a case, every member of the set is said to be orthogonal to every other member of the set, and such a set of functions is called orthogonal. If the members of the set have the following additional property $$\int_a^b [\phi_k(x)]^2 \cdot dx = 1 \tag{4}$$

for all values of k, such a set of functions is called orthonormal. A set of orthogonal or orthonormal functions provide the best approximation to any given function f(x) in the least square sense. In such a case the error is given as $$E = \int_a^b \left( f(x) - \sum_{k=1}^{\infty} c_k \cdot \phi_k(x) \right)^2 \cdot dx \tag{5}$$

the minimum error is found by equating the derivative of E with respect to $c_k$ to zero as follows:

$$\frac{\partial E}{\partial c_k} = 0 \tag{6}$$

It can be readily shown that the minimum occurs when $$c_k = \frac{\int_a^b f(x) \cdot \phi_k(x) \cdot dx}{\int_a^b (\phi_k(x))^2 \cdot dx} \tag{7}$$

When using orthonormal functions, the denominator of Equation 7 becomes unity. Also note that Equation 8 shown below is a generalization of Fourier series.

$$f(x) = \sum_{k=1}^{\infty} c_k \cdot \phi_k(x) \tag{8}$$

A theorem showing that an ONN can map any input vector to any output vector within a mean square error accuracy will now be proven.

The mapping function f that will be discussed maps from a compact subset S of n-dimensional Euclidean space to a bounded subset f(S) of m-dimensional Euclidean space by training on examples $(x_1,y_1), (x_2,y_2), \ldots, (x_j,y_j), \ldots$ of the mapping where $y_j=f(x_j)$. Now the mapping function f has m components, one for each output node. These are designated as $f_1, f_2, \ldots f_j, \ldots f_m$. Each one of these relate to n other mapping functions as follows:

$$f_j(x_1, x_2, \ldots, x_n) = f_{1j}(x_2) + \ldots + f_{nj}(x_n) \tag{9}$$

Because of this the index ij is used for the components of the mapping function f between input and output vectors. Also, the index ikj is used for the weights between the sibling and output nodes.

Theorem 1. Given, for any $\epsilon > 0$, a mapping function $$f: x \subset R^n \rightarrow y \subset R^m \tag{10}$$

there exists an ONN that can approximate f to within $\epsilon$ mean squared error accuracy.

Proof: Let us first consider the mapping function $f_{ij}$ that maps the component $x_i$ of the input vector x to the output node j. Let $\epsilon$ be the accuracy to which the mapping function $f_{ij}$ is to be approximated. It has been noted from the error equation, Equation 5, that given any $\delta_{ij} > 0$, there exists a positive integer N and a set of coefficients $c_{ikj}$ such that $$\int_a^b \left( f_{ij}(x_i) - \sum_{k=1}^{N} c_{ikj} \cdot \phi_k(x_i) \right)^2 \cdot dx < \delta_{ij} \tag{11}$$

The theorem will be proven by first pointing out that the configuration of the ONN shown in FIG. 1 results in an activation at the output node j which is identical to the summation inside the bracket shown on the left hand of Equation 11. This is because the $\phi_k$ terms are generated at the sibling nodes 20. Moreover, the weight of the links 25 between the N sibling nodes and the output node j approaches the values of the coefficients given in Equation 7, as the error at the output node j approaches zero during the training process.

Secondly all n components of the mapping function that maps the input vector x to the output node j are considered. For this the following equation can be formulated:

$$\sum_{i=1}^{n} \int_a^b \left( f_{ij}(x_i) - \sum_{k=1}^{N} c_{ikj} \cdot \phi_k(x_i) \right)^2 \cdot dx < \delta_j \tag{12}$$

For each input node 10 there is an equation like Equation 11. If the n errors designated as $\delta_{ij}$ at the output node j approach to zero during the training process, their sum $\delta_j$ shown in Equation 12 also approaches zero. This proves our theorem for the output node j. The repetition of this proof for all the output node 30 proves Theorem 1.

When N (number of sibling nodes to be used for each input node 10) is selected to be 3, the following functions were used:

$$\phi_0(x_i) = \frac{1}{\sqrt{2}} \qquad (13)$$

$$\phi_1(x_i) = \sin(\pi x_i) \qquad (14)$$

$$\phi_2(x_i) = \cos(\pi x_i) \qquad (15)$$

When N is selected to be 5, the following two additional functions were used:

$$\phi_3(x_i) = \sin(2\pi x_i) \qquad (16)$$

$$\phi_4(x_i) = \cos(2\pi x_i) \qquad (17)$$

It can be shown that all five functions given above are orthonormal for $1 \leq x \leq 1$. In some applications x was lying outside of this range. By placing a sigmoid filter before the input nodes x is forced to remain between 0 and 1. This can be seen by considering the sigmoid shown below.

$$s(x) = \frac{1}{1 + e^{-x}} \qquad (18)$$

where $x = -\infty \; s(x) = 0$ $x = 0 \; s(x) = 0.5$ $x = \infty \; s(x) = 1$

In training it is found that when using N=3, the sum of the squared errors initially decreased at a faster rate than when using N=5. However, over a longer period of time N=5 achieved lower errors. In operation the testing time was shortened by combining the $\phi_0$ terms. From Equation 13 it is clear that these terms are not functions of x. This combination reduced the number of sibling nodes from 3n to (2n+1) when N=3, and from 5n to [4n+1] when N=5.

Because the ONN's use either orthogonal functions or orthogonal polynomials a brief background on orthogonal polynomials will now be provided. A detailed description of orthogonal polynomials and the proofs of several theorems cited here are provided in the references entitled "Advanced Engineering Mathematics," Wylie Jr. C. R., (1960), pp. 130–143, McGraw-Hill Book Company, New York, N.Y., and "Numerical Analysis," Milne, W. E. (1949), pp. 265–275 and 375–381, Princeton University Press, Princeton, N.J.

Consider a set of (k+1) polynomials of respective degrees m=1,2, . . . ,k. If these polynomials have the following property $$\sum_{x=0}^{k} P_{ki}(x) \cdot P_{kj}(x) = 0 \qquad (19)$$

for $i \neq j$, they are called orthogonal polynomials.

It can be shown that these (k+1) orthogonal polynomials can be obtained using the following formula:

$$P_{km}(x) = \sum_{i=0}^{m} (-1)^i \binom{m}{i} \binom{m+i}{i} \frac{x^i}{k^i} \qquad (20)$$

for m=1,2, . . . ,k.

For each $m \leq k$, any polynomial P(x) of degree m can be expressed as a linear combination of orthogonal polynomials as follows:

$$P(x) = \sum_{i=0}^{m} c_i P_{ki}(x) \qquad (21)$$

Equation 21 can readily be solved for $c_i$ obtaining the following formula:

$$c_i = \frac{\sum_{x=0}^{k} P(x) P_{ki}(x)}{\sum_{x=0}^{k} [P_{ki}(x)]^2} \qquad (22)$$

Consider a function f(x) defined for (k+1) equally spaced values x=0,1,2, . . . k. Orthogonal polynomials cannot represent f(x) exactly unless f(x) is a polynomial of degree k or less. However, they provide the best polynomial approximation to f(x) in the least-square sense. In this case the error is given as follows:

$$E = \sum_{x=0}^{k} \left( f(x) - \sum_{i=0}^{k} c_i P_{ki}(x) \right)^2 \qquad (23)$$

The condition for minimum error is obtained by equating the derivative of E with respect to $c_i$ to zero. The result is as follows:

$$c_i = \frac{\sum_{x=0}^{k} f(x) P_{ki}(x)}{\sum_{x=0}^{k} (P_{ki}(x))^2} \qquad (24)$$

Note that the Equation 24 is exactly the same as Equation 22 with P(x) replaced by f(x) This means that the values of $c_i$'s that result in minimum error can now be calculated. This is a very important result and will be used to reduce the training time of the ONN's.

It should also be noted that the orthogonal polynomials described here can be used in ONN's exactly the same way as the orthonormal functions described previously. For example, in a character recognition system, where the components of the input vector are binary and k=1, the following orthogonal polynomials derived from Equation 20 were used:

$$P_{k0}(X) = 1 \qquad (25)$$

$$P_{k1}(X) = 1 - 2x \qquad (26)$$

By comparing Equations 24 and 7 it can be seen that Equation 24 is a discrete form of Equation 7. In some applications f(x) may not be a continuous function of x. Instead f(x) may consist of several discrete values. If the orthonormal equations given are used with functions having discrete values, Equation 24 rather than Equation 7 will be used. When this is done P(x) in Equation 24 is replaced by $\phi(x)$.

Another important result that will be utilized later should now be pointed out. Note that Equation 22 does not involve m, the degree of polynomial used, and hence N, the number of sibling nodes assigned to each input node, is not involved. If it is desired to increase N, all previously calculated coefficients remain unchanged. Only the coefficients of the new terms need be computed.

DETAILED DESCRIPTION OF THE METHOD

In many applications the input vector has components that have equally spaced values. In some other applications, by using an auxiliary variable, the values of these components could be made to appear as if they were equally spaced. Among these applications the most important group is the one where the components of the input vector are binary.

One such ONN application is the character reading system that was built for the recognition of damaged upper case letters (damaged implies that part of the letter is missing). In this system there were 25 input nodes, i.e., n=25. These nodes were assigned the values of 0 or 1 from a 5×5 grid. Also there were 26 output nodes, one for each letter of the alphabet. The output nodes were assigned a target value of 0.5, i.e., a=0.5. Two different versions of this system were built. One of them used orthogonal functions and the other orthogonal polynomials.

The first character reader was built using the orthogonal functions given by Equations 13, 14, and 15, i.e., N=3. In this system it was planned to reduce the training time by initialization of the synaptic links between the sibling and output nodes with the three c coefficients calculated using Equation 24 where $\phi(x)$'s were substituted for $P(x)$'s. The objective was to start the training process with a small error which can then be reduced to zero within a maximum of fifty cycles. To achieve this objective the three c coefficients were determined and their values substituted for the synaptic links. It was desired to have at a given output node 95% of the activation so that the training process could start with a small error of 5

. Because a=0.5 and the percentage of activation e=0.95, the error was calculated as (a−(e.a))/a=0.05 or 5%.

It should be noted that for purposes of this disclosure, the notation "." stands for multiplication, such that, for example, [4.2]=8.

Before these three coefficients could be calculated, it was necessary to estimate the discrete values of f(x) for the constant, sin, and cos terms given by Equations 13, 14, and 15 respectively. To estimate the values of f(x) the following two assumptions were made:

(i) Each sibling node contributes an equal amount to the total activation at a given output node;

(ii) If the sibling nodes of a particular term generates no activation, the nodes of the other terms contribute equal amounts making up the difference These assumptions were based on the observation of several repetitive patterns on the synaptic link values that were generated during training sessions.

The activation generated by each node was assumed to be f(x)=(e.a)/(N.n). Since a=0.5, e=0.95, N=3, and n=25, f(x) was 0.0063. However, because for x=0 and x=1 the sin and cos terms resulted in zeros in Equation 24, i.e., no activation, f(x) for the constant term was assumed to be 3×0.0063 or 0.189 to make up the difference. Based on this the three coefficients were calculated as follows:

$$c_1=0.0267 c_2=0.0 c_3=0.0$$

In the program the synaptic links between the, sibling and output nodes were represented by the array m (k) (i) (j) where k, i, and j were indices for the sibling, input and output nodes respectively. Hence there were a total of 3×25×26=1950 coefficients. The m (k) (i) (j) array was initialized with the three coefficients given above in accordance with their k index, which varied from 1 to 3.

The use of this technique resulted in a dramatic 200 fold reduction in the number of training cycles necessary for a satisfactory operation. More specifically, using this technique, the sum of the squared errors over 26 output nodes was reduced to 0.000000 after 7 cycles of training.

Note that after the first cycle the sum of the squared errors was 0.015569. This was slightly lower than the calculated value of 26×(0.5−0.475)²=0.0163. In training, a modified form of the delta rule was used. More specifically, in training the data associated with letter A was used with the output node #1, and the data associated with letter B was used with the output node #2, etc. Also all output nodes were assigned the same target value of 0.5. The output node having the smallest error identified the character, damaged or not. The learning rate was 0.01. The coefficient of the momentum term was 0.4.

A second character reader was built with the orthogonal polynomials given by Equations 25 and 26. Once again it was assumed that the activation generated by each sibling node was f(x)=((e.a)/(N.n)). Since a=0.5, e=0.95, N=2, and n=25, f(x) was 0.0095. Because for x=0 and x=1 the term (1−2) resulted in zero in Equation 24, i.e. no activation, f(x) for the constant term was assumed to be 2×0.0095 or 0.019 to make up the difference. Based on this the two coefficients were calculated as follows:

$$c_0=0.0190 c_1=0.0$$

The sum of the squared errors over 26 output nodes using the coefficient initialization technique was 0.000000 after 7 training cycles. After the first cycle the sum of the squared errors was 0.016250, slightly lower than the calculated value of 0.0163. The learning rate was 0.01. The coefficient of the momentum term was 0.4.

The coefficient initialization technique introduced above was for applications where the components of the input vector had equally spaced values. This condition cannot be met in many applications where the components of the input vector have greatly varying values. An ONN curve detection system that was built, for example, is one of those applications. Because of this a general method for reducing the training time will now be presented. This method can be used in all applications without placing any restrictions on the values of the components of the input vector.

In this curve detection system the components of the input vector had widely varying negative and positive values. These values were transformed into {0,1} space by placing a filter before the input nodes of the ONN. This filter used the sigmoid function given by Equation 18. This brought the values of the components of the input vector much closer to each other. However, they were still not equally spaced and Equation 24 could not be used.

It was noticed that when Equation 24 was used previously, only the coefficient of the constant term had a non-zero value. Also the activation of the constant term was increased to make up the loss of activation from the nodes of the other terms. In addition, it was observed that at the end of training the values of the synaptic links corresponding to the constant term were only a few percent higher than the calculated values. Based on this the following general method was introduced:

(i) Place a sigmoid filter before the input nodes 10 of the ONN. Note that this filter is only used if the values of the components of the input vector are not equally spaced;

(ii) Calculate the coefficient of the constant term using Equation 24 and assuming an activation of f(x)=((e.a)/n) as follows:

a) when using orthogonal functions $$c_1 = \frac{e \cdot a \cdot \sqrt{2}}{n} \tag{27}$$

b) when using orthogonal polynomials $$c_0 = \frac{e \cdot a}{n} \tag{28}$$

where
 a=the actual target value assigned to the output nodes
 e=percentage of the target value achieved before training
 n=number input nodes Recall that previously these constants were a=0.5, e=0.95 and n=25. Also note that Equations 27 and 28 do not involve N, the number of sibling nodes assigned to each input node.

(iii) Set the coefficients of the other nodes to zero.

The use of this technique in the curve detection system reduced the sum of the squared errors over four output nodes to 0.000000 in fewer than ten cycles. The minimum number of cycles encountered were 6 when using orthogonal functions with N=5 and maximum was 8 when using orthogonal polynomials with N=4.

In the curve detection system there were ten input nodes, i.e. n=10, and all four output nodes were assigned the same target value of 0.5, i.e., a=0.5. As before it was aimed to achieve 95% of the activation before the training started, i.e, e=0.95, (e.a)=0.475.

Note that in some of the experiments "e" was varied in steps of 0.1 from 0.9 to 0.97. This variation did not change the number of cycles that was required to reduce the error to zero (0.000000). However, in comparison to e=0.95, e=0.9 resulted in a slower rate of decrease of the error and e=0.97 in a faster rate of decrease.

The first curve detection system that was built used the orthogonal functions given by Equations 13, 14, 15, 16, and 17, i.e. N=5. For this f(x) was calculated as 0.0475 and $c_1$ as 0.0672. The other four coefficients were set to zero. The sum of the squared errors over 4 output nodes using these coefficients was 0.000000 after 8 training cycles. After the first cycle the error was 0.002500. This was the same as the calculated value of $4 \times (0.50 - 0.475)^2 = 0.0025$. The learning rate was 0.03. The coefficient of the momentum term was 0.4.

The second curve detection system was built using the following orthogonal polynomials derived from Equation 20:

$$P_{k0}(x) = 1 \tag{29}$$

$$P_{k1}(x) = 1 - (2/9) x \tag{30}$$

$$P_{k2}(x) = 1 - (6/9)x + (6/72)x(x-1) \tag{31}$$

$$P_{k3}(x) = 1 - (12/9)x + (30/72)x(x-1) - (20/504)x (x-1)(x-2) \tag{32}$$

Note that since there were 10 input nodes, k=9. For this system f(x) was calculated as 0.0475 and $c_0$ as 0.0475. The other three coefficients were set to zero. The sum of the squared errors over 4 output nodes using these coefficients was 0.000000 after 6 training cycles. After the first cycle the sum of the squared errors was once again 0.002500. The learning rate was 0.01. The coefficient of the momentum term was 0.4.

A third curve detection system was built using orthogonal polynomials given by Equations 29, 30, 31, and 32. This system was similar to the one described above except that each input vector was mapped to a different output vector.

More specifically, the following four output vectors were used:

(0.5, 0.1, 0.1, 0.1)
(0.1, 0.5, 0.1, 0.1)
(0.1, 0.1, 0.5, 0.1)
(0.1, 0.1, 0.1, 0.5)

Because there were now four target values, and four times as many synaptic links as before, it was necessary to calculate four different coefficients of the constant term. Fortunately, there are only two distinct coefficients. One of these is for the nodes having the target value of 0.5 and the other for the nodes having the target value of 0.1. These coefficients are calculated using an extension of the general method described previously. This extension will now be described by first giving an example.

When the output nodes are decoupled from each other and all of them have the same target value, calculation of the coefficient of the constant term is carried out quite easily using Equations 27 or 28. However, when there are four output nodes with different target values, the distribution of activations has to be considered and the coefficients of the constant term has to be calculated on the basis of this distribution.

Recall that previously the training was started with a 5% error, i.e., a=0.5, e=0.95, and (e.a)=0.475. This resulted in a sum of the squared errors of $4 \times (5-0.475)^2 = 0.0025$. In this case there was a total activation, $F_1(x)$, on the output node with the target value of 0.5 and three total activations, three $F_2(x)$'s, on the nodes with the target value of 0.1. The activations that result in the same sum of the squared errors over the four output nodes is now calculated as follows:

$$(0.5 - F_1(x))^2 + 3 \cdot (0.1 - F_2(x))^2 = 0.0025 \tag{33}$$

Because the ratio of the two target values is 5 to 1, it is assumed that $F_1(x) = 5 \times F_2(x)$. Based on this assumption the quadratic given by Equation 33 is solved finding $F_1(x) = 0.4528$ and $F_2(x) = 0.0906$. Since there are ten input nodes, the coefficient of the constant term for the output node with the target value of 0.5 is 0.04528 and the other three coefficients for the output nodes with the target values of 0.1 are 0.00906.

When the system was initialized with these coefficients, the sum of the squared errors over 4 output nodes became 0.000000 for each output vector after 6 cycles. After the first cycle the sum of the squared errors was 0.0025. The learning rate was 0.01. The coefficient of the momentum term was 0.4.

Having given an actual example, the extension of the general method to cases where every input vector is mapped to a different output vector. It is assumed that there is one larger target value $a_1$ and (m−1) smaller target values $a_2$'s, where m is the number of output nodes. The coefficient of the constant term for the node with the target value $a_1$, $c_1$ and the other (m−1) nodes with the target values of $a_2$, $c_2$, are calculated as follows:

$$c_1 = \left( \frac{a_1}{a_2} \right) \cdot \left( \frac{k}{n} \right) \cdot \left( \frac{-B \pm \sqrt{B^2 - 4 \cdot A \cdot C}}{2 \cdot A} \right) \tag{34}$$

$$c_2 = \left( \frac{k}{n} \right) \cdot \left( \frac{-B \pm \sqrt{B^2 - 4 \cdot A \cdot C}}{2 \cdot A} \right) \tag{35}$$

-continued where $$A = a_1^2 + (m-1) \cdot a_2^2 \qquad (36)$$

$$B = 2 \cdot a_1^2 \cdot a_2 + 2 \cdot (m-1) \cdot a_2^3 \qquad (37)$$

$$C = a_1^2 \cdot a_2^2 + (m-1) \cdot a_2^4 - m \cdot a_1^2 \cdot a_2^2 \cdot (1-e)^2 \qquad (38)$$

$k=2^{0.5}$ if orthogonal functions used $k=1$ if orthogonal polynomials are used $n=$number of input nodes $e=$percentage of activation to be achieved before training Note that e is always set to 0.95, and in the curve detection system example $a_1=0.5$, $a_2=0.1$, $m=4$, $n=10$, and $k=1$. Also note that in the above example the negative values of the square root in Equations 34 and 35 were used. When the positive values were used, it was found that $c_1=0.0547$ and $c_2=0.010946$. When the system was initialized with these values, the results were identical to the ones obtained with the coefficients $c_1=0.04528$ and $c_2=0.00906$.

So far five different training examples have been presented. In these examples the sum of the squared errors became 0.000000 in fewer than ten cycles. The minimum number of cycles encountered was 6 and maximum number was 8. It is found that (i) Orthogonal functions and orthogonal polynomials perform equally well; and (ii) Although orthogonal functions allow the use of higher learning rates, orthogonal polynomials result in slightly smaller errors for the same number of cycles.

Now a more detailed look will be taken at the behavior of the sum of the squared errors in the curve detector system built with orthogonal polynomials. In particular, these errors will be compared with the errors encountered in a similar curve detection system built using backpropagation technique and trained with the same sample curves. In Table 1 the number of cycles are listed against the sum of the squared errors encountered in the ONN and backpropagation networks using a scale of $10^{-6}$.

TABLE 1

| | Number of Cycles vs. Sum of Squared Errors | |
|---|---|---|
| # Cycles | Errors in ONN | Errors in Backpro. |
| 5 | 1.743 | 156,655 |
| 6 | 0.085 | 155,693 |
| 7 | 0.033 | 154,713 |
| 8 | 0.023 | 153,709 |
| 9 | 0.019 | 152,679 |
| 10 | 0.018 | 151,609 |
| 50 | 0.016 | 77,667 |
| 100 | 0.015 | 31,397 |
| 500 | 0.008 | 1,238 |
| 1000 | 0.005 | 148 |

As can be seen from the Table 1, the sum of the squared errors encountered in the ONN reduces slowly after the 10th cycle. At the end of the 10th cycle the sum of the squared errors of the ONN is smaller than that of the backpropagation system by a factor of $8.422 \times 10^6$. At the end of the 1000th cycle this factor is reduced to $29.6 \times 10^3$.

It was mentioned previously that conventional single-layer networks cannot learn mappings that have very different outputs from very similar inputs. To illustrate that this does not apply to ONN's, an example will be given showing how the classic exclusive-or problem can be solved in an ONN using, for example, the polynomials given by Equations 25 and 26.

Consider an ONN with two input and two output nodes where the target values of 0.5 are assigned to the output nodes and the coefficients of the constant terms are set to 0.25. In this system minimum error at the output node #1 signals a zero and at the output node #2 a one. At the end of the learning process the weights between the input nodes and the output node #1 will be (1,1), and the weights between the input nodes and the output node #2 will be (1,1).

DETAILED DESCRIPTION OF THE APPARATUS

The architecture illustrated in FIG. 1 consists of three sets of nodes, input 10, sibling 20, and output nodes 30. The input nodes 10 and output nodes 30 are neuron-like units. The sibling nodes 20 are neural subsystems made up of many neurons. These nodes house special functions that carry out the orthogonal expansion of the mapping function between input and output vectors I and O, respectively. There are n input nodes 10. FIG. 1 shows the first, second and the n'th input node. Each input node 10 branches out into N sibling nodes 20 through a first synaptic link 12, 12' etc. the conductivity, or weight, of which remains fixed at unity during the training process. Note that in FIG. 1, N=3. As a result of this branching out there are [n.N] sibling nodes. Also there are m output nodes. FIG. 1 shows the first, second and m'th output node. Each output node 30 is connected to every sibling node through a second synaptic link 25, the conductivity, or weight, of which changes during the training process to reduce the difference between the actual and desired outputs at these output nodes 30.

FIG. 2 is a block diagram illustrating the training portion of the artificial neural network architecture to be implemented either on a hardware unit or on a computer chip.

Because all sets of N sibling nodes 20 house the same set of N transfer functions, a unit consisting of either N special arithmetic units or one general arithmetic unit 14 can be connected to n input nodes through an input multiplexer 16. The N outputs of this arithmetic and storage unit 14 are connected to N weight multipliers 18. The outputs of N weight multipliers 18 are then connected to the adder unit 22 where the activations are generated by adding the products of the signals from sibling nodes 20 and the corresponding weights of the synaptic links 25 shown in FIG. 1 between sibling and output nodes 20 and 30, respectively. The output of the adder is connected to m output nodes through an output multiplexer 24. The output nodes 30 are connected to a comparitor unit 26 where the activations are compared with the target values and an error signal is generated. This error signal is fed into a weight changer unit 28 that determines how much a particular weight is to be changed to minimize the error. In addition a weight initializer unit 32 is connected to the weight multipliers 18 for the purposes of setting the initial values of the weights so as to reduce the duration of the training time.

It is clear from the above description of the hardware of the ONN shown in FIG. 2 that the one subsystem comprising an arithmetic and storage unit, an adder and a set of N weight multipliers, a weight changer and a weight initializer can be multiplexed on one side to n input nodes and on the other side to m output nodes making the design of a hardware unit or computer chip quite compact and economical.

For neural networks that use the same target value in all output nodes the training time can be considerably reduced by duplicating the certain portion of the hardware system described in the paragraph above by m times. The portion of the hardware to be duplicated consists of a weight initializer, a weight changer, an adder, a set of N weight multipliers, and a comparitor unit. In such an arrangement the arithmetic unit processes all the input data associated with the output node #1, stores it in memory, and starts the training process for the output node #1. At the same time the arithmetic unit starts processing and storing the input data associated with the output node #2. When this is done the training process for the output node #2 starts without waiting for the conclusion of the training process for the output node #2. Because arithmetic process takes much shorter time to complete than training process, the training of "m" output nodes is carried out almost in parallel. The duplication of the units mentioned above is quite easy to accomplish on a computer chip. Also note that the arithmetic unit is still connected to n input nodes through an input multiplexer. However, because there are as many adders, comparitors, etc., as the output nodes, no output multiplexer is necessary.

Figure 3:
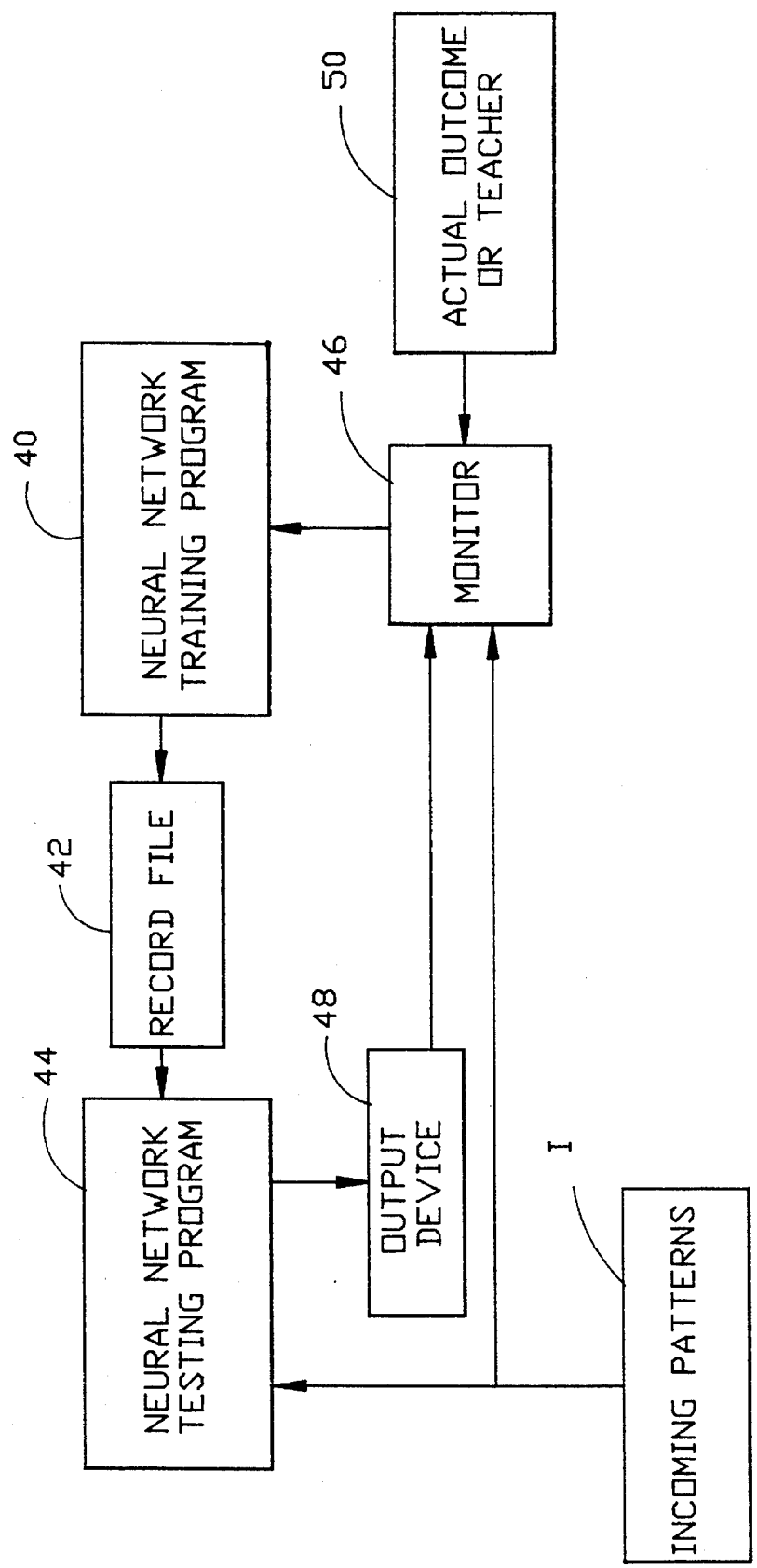
FIG. 3 is a diagram of the software architecture of the present invention utilizing a monitor to make the invention part of a real-time control system and allow the invention to learn during operation and improve its performance.

The ability of the present invention to learn in real-time makes it possible for a neural network to be part of a real-time control system. The block diagram of the software architecture of the present invention to achieve this objective is shown in FIG. 3. The neural network "training program" 40 using sets of sample patterns I represented by input data signals $I_1-I_n$ generates the "record_file" 42 that lists synaptic link values 25. The neural network "testing program" 44 receives the incoming patterns I, or input data signals $I_1-I_n$ and identifies them using the record_file. An output device 48 provides the identification/classification/prediction of the testing program 44. The incoming data signals are also received by the "monitor" 46. An actual outcome signal is introduced to the monitor 46 by actual outcome source 50, which may be a user activated device or an automatic source of relevant actual data signals corresponding with the actual result which the neural network is designed to preduct or ascertain. This outcome signal, which may be provided by any appropriate teacher, is then compared to the value of the output device through comparison means of the monitor. Some of the system control functions of the monitor are as follows:

(i) to compare the predictions yielded by the test program 44 with the actual outcome or the input by a teacher;

(ii) to add one or more new identification classes;

(iii) to add a new pattern or a set of patterns to the training patterns of an existing class;

(iv) to remove a pattern or a set of patterns from the training patterns of an existing class;

(v) to allow the neural network to learn on the job and improve its performance.

The monitor performs these functions by capturing a pattern or a set of patterns and causing the training program to learn them with the existing patterns or relearn the existing patterns after the removal of these patterns. When this is done, the training program modifies the record_file. The monitor 46 can take many forms. For example, it can be an expert system, a second neural network or a software feature built into the original neural network. In its most elementary form the monitor could simply be an operator acting as a teacher.

Considering a diagnostic application of the curve detection system built with an ONN and described earlier, if an unknown family of patterns appears several times causing a certain identifiable result or outcome, the monitor 46 observes and tracks this phenomenon. Because this particular family was not included in training, the neural network testing program 44 is unable to identify it. If there are more than "m" duplications of the hardware system illustrated in FIG. 2, the monitor captures the data associated with this new family of patterns and immediately trains a new (m+1)th output node without changing the weights associated with "m" previous output nodes allowing the system thereafter to identify these pattern.

In many industrial applications metal or plastic parts are engraved with letters for the purpose of identification. On the assembly line these characters are read by an optical scanner and the information is transmitted to the next station. Unfortunately during the manufacturing operation quite often a few of these characters get damaged or covered with dirt. Because of this there is a need for reading damaged characters. Also, because of the high speed of the modern assembly line, the identification of a string of about 20–30 alphanumeric characters has to be done in less than a second.

Considering the damaged character reading system built with an ONN and described earlier, training of the neural network requires a large number of actual examples of damaged characters. After training with a few samples, if an operator could act as a monitor, he or she could identify the damaged characters that the neural network could not. This causes the system to be retrained quickly and efficiently.

Considering the case where the monitor is simply a software feature within the neural network, if a damaged character cannot be identified within a preset error limit, the monitor examines the errors that occurred on all the output nodes. The character corresponding to the output node with the smallest error is then identified as being the most similar one to the damaged character. Based on this finding the training program learns this pattern and modifies the record_file. As a result, the neural network can learn on the job while The control system functions within its time constraints.

Unfortunately, there are instances where the software feature described above may come out with two or more equally similar characters and the neural network cannot identify the damaged character. To handle these cases it is necessary to include a rule-based expert system in the monitor. Such an expert system will work on the statistical likelihood of one character being followed by another within the alphanumeric character string engraved on the parts. For example, one of the rules may state that if the first character is a "t" and the second is "h" then the third character is an "e" The use of such an expert system as a part of the monitor will break the deadlock resulting from having equally similar characters and allow the modification of the record_file in the usual manner.

Also two different types of neural networks can function side by side and learn from each other on the job. The operation of the damaged character reader described earlier was based on building a 5×5 grid on and around a character and obtaining binary inputs on the intersections of this grid and the character. Another character reading system based on "feature detection" can be built and included in the monitor. A character reader based on feature detection concentrates on the features of a letter instead of its coordinates. For example, it will always recognize an oval shaped closed curve as the letter "O" regardless of its intersection with its grid. When using a monitor equipped with a neural network, if the first neural network does not recognize a damaged character and the second one does, then the monitor modifies the record_file of the first neural network. On the other hand, if the situation is reversed so that the second one does not recognize the damaged character and the first one does, the monitor then modifies the record_file of the second neural network.

Consider the case where a neural network classifies a set of conditions and recommends certain actions to the control system based on these classifications. In such case, if the monitor using other means, for example, an expert system, determines that a pattern classified as a particular class by the neural network could result in an undesirable action, the monitor removes such a pattern from the original sample of patterns, retrains the system and modifies the record_file. This real-time process of learning and retraining is an important advantage in time critical control system application where, for example, a missile or torpedo is fired to hit a particular target.

One of the best examples of on the job training can be given by citing the operation of a neural network designed to predict the up and down movements of the stocks. When the market opens up in the morning, the neural network may predict the fluctuations of the stocks with a 30–35% accuracy. However, if it is allowed to operate and train itself, by mid-day its accuracy may increase to 80–85%. This can be achieved by the monitor adding to the training patterns several new patterns corresponding to the movements that the neural network could not predict, and by removing from the training patterns some patterns that resulted in the wrong predictions.

By way of illustration of the above example regarding the stock market, a number of input data signals 1 through N corresponding to n market parameters (such as unemployment rate, inflation rate, prime rate, etc.) are input to input nodes 1 through n, respectively. These input data signals $I_1$ through $I_n$ correspond to n market parameters and represent the "condition" of the market at that particular time. These parameters are then mapped to the output nodes $O_1$ through $O_m$, which in turn is converted to an output signal which is displayed on an output device 48 connected to testing processor 44 indicating a particular action to be taken. For example, the neural network may recognize that, in the past, with a given set of input parameters $I_1$ through $I_n$, the market behaved in a particular, known, way when that same market "condition" is present again, the neural network will output a recommendation predicated on what occurred in the market when that set of parameters was earlier present. The actual market response is thereafter fed into the neural network. If the actual response differs from the output recommendation, or prediction, which the neural network made, the training process or 40 after retraining itself will adjust the weights of synaptic links 25, thereby and removing the response to such a pattern from the original sample of patterns, retrain the system and modify the record_file.

The monitor in some ways functions like the operating system of a computer or frontal lobe of a human brain. It controls and coordinates the operation of the testing and training programs of the neural network and its associated files.

Therefore, the training portion of the artificial neural network architecture can be carried out wherein arithmetic unit 14 processes all of the input data $I_1$–$I_n$ associated with the output node #1, stores the associated weight values in memory, and starts the training process for output node #1. At the same time the arithmetic unit starts processing and storing the input data associated with output node #2. When this is done the training process for output node #2 starts without waiting for the conclusion of the training process for output node #1. Because the arithmetic process takes much shorter time to complete than training process, said training of "m" output nodes is carried out almost in parallel resulting in a reduced training time. Further, there can be more than "m" duplications of subsystems consisting of "N" weight multipliers, an adder, a comparitor, a weight changer, and a weight initializer so that if an unknown family of patterns appears several times causing a certain identifiable result or outcome, and if the data associated with said new family of patterns is captured, then a new (m+1)th output node can be immediately trained without changing said weights associated with "m" previous output nodes allowing the system thereafter to identify said patterns.

The ONN is very important in many military applications, because its real-time training and testing function can be implemented using a special computer chip. This importance becomes greater in applications involving, for example, torpedoes, missiles, super-sonic aircraft, etc. where space is at a premium.

For example, in an aircraft, missile or a torpedo, an ONN may be used to map a set of parameters pertaining to the feature and terrain maps, weather, aircraft or missile type, primary and secondary targets, time on target, etc. to a specific mission and route plan. It would be very desirable to train the ONN during flight with the latest information about weather, intelligence, etc., so that accurate mission and route plans could be produced.

Similarly an ONN may be used to map a set of mission and route plans to a specific data pertaining to the speed, rate of climb, rate of turn, etc. Also based on this data an ONN may be used to predict the position of the aircraft/missile/torpedo at a certain instant of time. If this prediction is found to be wrong, the monitor using reverse mapping would attempt to determine the data that caused this inaccuracy.

The reverse mapping is achieved using the same ONN shown in FIGS. 1–3, but training it with coordinates at a certain instant of time as input data signals, and the speed, rate of climb, rate of turn, etc. as output data signals. To achieve this it is required to have two record_files. One of these would contain synaptic information for mapping in the forward direction and the other would contain synaptic information for mapping in the reverse direction. It is also necessary to have two parameter files, one for the forward direction and the other for reverse. These files list the number of input and output terminals used, as well as other important parameters.

If the monitor 46 fails to find any data from teacher 50, such as the speed, rate of climb, etc., that could have caused this inaccuracy, it would assume that the mapping functions used by the ONN changed due to some other unknown external or internal factor. For example, in the case of a torpedo this unknown factor could be an unexpected underwater current. To compensate for this effect the monitor would retrain the ONN. This retraining could take place several times on route and, as a result, the probability of hitting the target becomes much greater.

Figure 4:
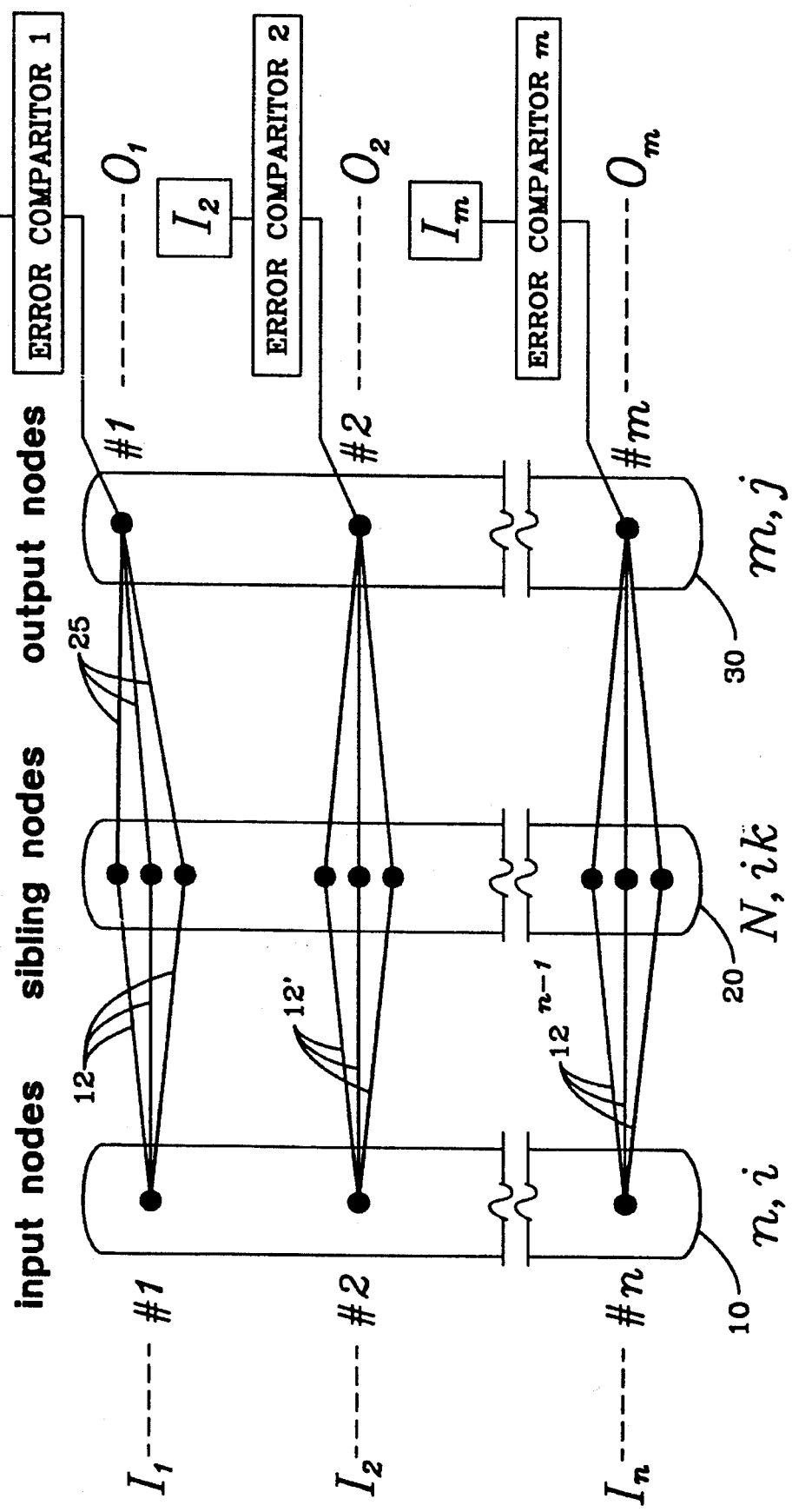
FIG. 4 is a diagrammatic illustration of an auto-associative neural network used with an embodiment of the present invention.

Another learning paradigm is known as "auto-association" in which an input pattern is associated with itself. The goal here is pattern completion. When an incomplete pattern is presented, the auto-associator restores it to its original form. The architecture of the auto-associative neural network is shown in FIG. 4. This network is the same as that of FIG. 1 excepting that the number of output nodes is equal to the number of input nodes, i.e., n=m. That is, output node #1 is connected to input node #1, output node #2 is connected to the node #2, output node #3 is connected to input node #3, etc.

The target value at each output node is equal to the input data signal at the corresponding input node, i.e., $a_j=x_i$ where i=j. It should be noted, however, that in applications where the components of the input vector are not equally spaced the input signal may be put through a sigmoid filter given by Equation 18. Also it should be noted that because the target value at each output node is different, the coefficient of the constant term for each set of sibling nodes will be different.

Based on the foregoing, the general method of coefficient initialization can be stated for auto-associative neural networks as follows:

(i) Place a sigmoid filter before the input nodes of the ONN. Note that this filter is only used if the values of the components of the input vector are not equally spaced;

(ii) Calculate the coefficient of the constant term using Equation 24, assuming an activation of $f(x)=[e.x_i]/n$ as follows:

a) when using orthogonal functions $$c_{i1}=(e.x_i \cdot 2^{0.5})/n \tag{39}$$

b) when using orthogonal polynomials $$c_{i0}=e \cdot x_i/n \tag{40}$$

where $x_j$=the actual target value assigned to the output node j where i=j e=percentage of the target value achieved before training n= number input nodes =m=number of output nodes.

Recall that previously these constants were a=0.5, e=0.95 and n=25. Also note that Equations 27 and 28 do not involve N, the number of sibling nodes assigned to each input node; and (iii) Set the coefficients of the other nodes to zero.

An auto-associative neural network together with a pattern associative neural network was used to identify damaged characters. The operation of the two neural network system was based on the identification of features. The use of features rather than the coordinates of the points of a letter to identify characters is very efficient, and it makes the positioning of an optical device to capture the image of a character very easy. The problem, however, with using features is that if the character is damaged, i.e., any of its points is missing, then the feature is lost. For example the letter "O" can be identified because it is an oval shaped closed curve. However, if one of the points is missing, the curve is no longer closed, and the closed loop feature is lost.

In this embodiment, an auto-associative neural network was trained with the features of the undamaged characters. After training, when a damaged character is submitted to the auto-associative network, the auto-associative network attempted to restore most of the missing features. When this was done the pattern associative network shown in FIGS. 1 and 2 identified the character. In the auto-associative network a learning rate of 0.001 was used, and the coefficient of the momentum term was 0.4.

The advantage of learning in real-time is that if a new character, such as a # sign, appears and is recognized as a new sign, the auto-associative neural network can immediately train itself with the undamaged # sign so that it can restore its damaged versions. This basic identification concept can be extended from characters to symbols which can be signatures, radio signals, mechanical vibrations, battle field conditions, pictures, etc.

The unique properties of the ONN's that make them very desirable in signal processing applications and their use in three such systems will now be described.

The linear signal processing is widely used to remove unwanted noise from the corrupted signal. A good description of the linear signal processing theory can be found in the reference entitled "Signal Analysis" by Papoulis, McGraw-Hill, New York, 1977. The filters that are used to suppress the noise while leaving the signal unchanged can be fixed or adaptive. The fixed filter requires a priory knowledge of both the signal and noise parameters. Adaptive filters, on the other hand, can adjust their own parameters automatically, thus require little or no knowledge of the signal or noise characteristics. A description of the adaptive filters is provided in the reference entitled "Adaptive Signal Processing" by Widrow, B., and Stearns, S. D., Prentice-Hall, Englewood Cliffs, N.J., 1985.

Typically, a special type of neural network called ADALINE (ADAptive LINear Element) is used to remove the unwanted noise from the corrupted signal. A description of ADALINE is provided in the reference entitled "Neurocomputing" by Hecht-Nielson, R., Addison Wesley, N.Y., 1990, pages 57 and 339. The ADALINE has "n" input nodes, one output node, and no hidden nodes. The filtering is achieved by taking "n" consecutive samples from the corrupted signal in the form of a "time series" and estimating the uncorrupted signal component of the middle sample. Hence ADALINE is basically a transversal filter. The neural network is trained with a set of noise corrupted signals applied to the input nodes and a set of uncorrupted signals corresponding to the middle sample as the target values. In other words, it is assumed that for each set of n consecutive samples of contaminated sigals applied to the input nodes in training, the uncontaminated signal corresponding to the middle sample is known.

It should be noted that ADALINE is a linear system, whereas the three different ONN filters that we are going to disclose are nonlinear. For the reasons that are not too well understood the nonlinear filters perform much better than the linear filters.

In our first application it is assumed that uncontaminated signals corresponding to a set noise corrupted signals are known. In training we use the architecture illustrated in FIG. 1. We have seven input nodes, 5×7=35 sibling nodes, and one output node. The sibling nodes contained the functions given by the Equations 13–17. In training the following six sets of noise corrupted signals, i.e., signal plus noise, are applied to the input nodes:

| 0.2, | −0.15, | 0.3, | −0.05, | 0.4, | 0.05, | 0.5 | | | | |
|------|--------|------|--------|------|-------|-----|------|-----|------|------|
|      | −0.15, | 0.3, | −0.05, | 0.4, | 0.05, | 0.5, | 0.15 | | | |
|      |        | 0.3, | −0.05, | 0.4, | 0.05, | 0.5, | 0.15, | 0.6 | | |
|      |        |      | −0.05, | 0.4, | 0.05, | 0.5, | 0.15, | 0.6, | 0.25 | |
|      |        |      |        | 0.4, | 0.05, | 0.5, | 0.15, | 0.6, | 0.25, | 0.7 |
|      |        |      |        |      | 0.05, | 0.5, | 0.15, | 0.6, | 0.25, | 0.7, | 0.35 |

The following uncontaminated signals, corresponding to the middle sample (4th input node or middle tap) of the six training sets are used on the output node as the target values:

---
0.15, 0.2, 0.25, 0.3, 0.35, 0.4
---

The difference between contaminated signal, signal plus noise, and the uncontaminated signal, is the unwanted noise. From the signals shown above it is clear that the noise signals applied to the input nodes are the consecutive values of 0.2 and −0.2.

The synaptic values obtained during the training process is stored in the records_file. As shown in FIG. 3, the testing program uses the records_file to recover the original signal from the noise corrupted signal applied to its input nodes. The architecture of the testing program is the same as the one shown in FIG. 1. Like the training program it has seven input, 5×7=35 sibling nodes, and one output node. The difference between the two programs is that in training the values of all the synaptic links are not known while in testing they are obtained from the records_file except the coefficients of the constant terms which are calculated.

It should be noted that unlike ADALINE filter, the ONN filter departs radically from the linear filter theory. This is because of the nonlinearities introduced by the sin and cos terms of the sibling nodes. As a result we can no longer use the linear signal processing theory to analyze the performance of the ONN filter. Instead, we have to use the results of experiments to evaluate the nonlinear signal processing. The following results were obtained in testing:

| Actual signal | Recovered Signal |
|---|---|
| 0.15 | 0.149902 |
| 0.2 | 0.199922 |
| 0.25 | 0.249894 |
| 0.3 | 0.299912 |
| 0.35 | 0.349919 |
| 0.4 | 0.399888 |

In training a learning rate of 0.15 was used. The coefficient of the momentum term was 0.9. The training was terminated after 13 cycles when the mean squared error became $0.085 \times 10^{-6}$. Because the target values for the output node varied from sample to sample, the method of coefficient initialization for the decoupled output nodes given by Equations 27 and 28, and for the coupled output nodes given by the Equations 34 and 35, was ineffective in this application. To achieve rapid learning the coefficients of the constant terms were calculated as follows:

a-) when using orthogonal functions $$c_{1i} = a_i \cdot e \cdot 2^{0.5}/n \qquad (41)$$

b-) when using orthogonal polynomials $$c_{0i} = a_i \cdot e/n \qquad (42)$$

where
i=index assigned to the samples used in training,
$a_i$=target value for the sample i,
e=percentage of the training achieved before training,
n=number of input nodes.

In the first signal processing application described above we had n=7 and e=0.97. The c coefficients given above were used in all the cycles until training was completed. Because of this the same c coefficients were also used in testing program as the coefficients of the constant terms.

In the second applications it is assumed that the noise signal is known or independently obtained. Here we use the same architecture as the one used in the first application. In training six sets of noise samples consisting of consecutive values of 0.2 and −0.2 are applied to the seven input nodes. The target values of the output node are the noise corrupted signals. In this application the error does not become zero but tends towards the values of the original signal. The reason for this is that the error is the difference between the target value, i.e., signal plus noise, and the sum of activations on the output node. This is shown below.

$$E_i = s_i + n_i - y_i \qquad (43)$$

where
i=index assigned to the samples used in training,
$E_i$=error signal in the i'th sample,
$s_i$=uncontaminated signal in the i'th sample,
$n_i$=noise in the i'th sample,
$y_i$=sum of activations on the output node in the i'th sample.

If the sum of activations at the output nodes is an estimate of the noise, then the error is a very close approximation of the uncorrupted signal. For this reason we ran this program in a continual "training" mode. Because the error does not become zero but tends towards the values of the original signal, we did not use the coefficient initialization technique to speed up the training process which was already very fast.

The following results were obtained at the conclusion of the training process using a set of six corrupted signals −0.05, 0.4, 0.05, 0.5, 0.15, 0.6 as the target values at the output node and six sets of consecutive 0.2 and −0.2 noise signals applied to the input nodes:

| Original Signal | Recovered Signal |
|---|---|
| 0.15 | 0.150288 |
| 0.2 | 0.199712 |
| 0.25 | 0.250288 |
| 0.3 | 0.299712 |
| 0.35 | 0.350288 |
| 0.4 | 0.399712 |

In training a learning rate of 0.02 was used. The coefficient of the momentum term was 0.9. The training was terminated after 9 cycles when the mean squared error became 0.006667. The recovered signals shown above are actually the error signals. However, the error that the neural network saw was as follows:

$$E_i = (a_i - \text{bias}) - K \cdot y_i \qquad (44)$$

where
i=index assigned to the samples used in training,
$E_i$=error signal in the i'th sample,
$a_i$=target value assigned to the output node in the i'th sample,
$y_i$=sum of activations on the output node in the i'th sample.

The coefficients "bias" and "K" are calculated by the program from the values of the target values, i.e., signal plus noise, prior to training. The subtraction of the bias results in a zero mean for the target values. The multiplication of the sum of activations by K allows the subtraction of the correct amount of noise from the target values. The bias coefficient is calculated by finding the mean of the target values as follows:

$$\text{bias} = \sum_{i=1}^{N} a_i/n \quad (45)$$

where

N=Number of samples used in training,
n=number of input nodes,
$a_i$=target value assigned to the output node in the i'th sample, The coefficient K is calculated as follows:

$$K = (5/n) \cdot \sum_{i=1}^{N} a_i \cdot (-1)^i \quad (46)$$

where

N=Number of samples used in training,
n=number of input nodes.
$a_i$=target value assigned to the output node in the i'th sample, For the six corrupted signals −0.05, 0.4, 0.05, 0.5, 0.15, 0.6 that were used as the target values in the example given above, the bias and K coefficients were calculated and found to be 0.275 and 1.125 respectively. Note that these coefficients are dependent on the target values and not on the amplitude of the noise signal. As long as the noise signal retains the same wave form, the neural network will remove the 0.2 and −0.2 from the corrupted signal. In an experiment we reduced the noise signal applied to the input nodes to 0.002 and −0.002. Even then the program produced an error that was a very close approximation of the original signal.

In the first applications it was necessary to train the system using the uncorrupted signals as the target values of the output node. In the second system the noise signals were applied to the input nodes while the corrupted signals were used as the target values. However, in great applications neither the uncorrupted signal nor the noise is known. In such cases one has to work only with the corrupted signal. The third application is designed to remove the noise from the corrupted signal when neither the noise nor the uncorrupted signal is known.

In this application we are using the auto-associative architecture shown in FIG. 4. We have seven input nodes, typically 7×11=77 sibling nodes, and one output node. Eleven sibling nodes per input node gives us the constant term and five sin and five cos terms. The arguments of these sin and cos terms vary from $(\pi x_i)$ to $(5\pi x_i)$. These will be referred to as harmonics. The number of sibling nodes per input node, N, and hence the harmonics, ((N−1)/2), used will depend on the application in hand.

Once again we are taking seven consecutive samples from the noise corrupted signal and apply them in the form of a "time series" to the input nodes. The target values of the output node are the signals that are applied to the 4th input node (middle tap). When the training of this auto-associative network is completed and one of the sample set used in training is applied to the input nodes, the sum of activations at the output node would be approximately the same as the signal on the 4th input node.

As was pointed out on page 7 the Equation 8 is a generalization of Fourier series. This means that the synaptic values stored in the records_file represents the frequency spectrum of the signals appearing in the output node which is the same as the signals applied to the 4th input node. Using this unique property we can train the system using all five harmonics. Then by using only some of the harmonics in testing we can create a low pass, or a high pass, even a band pass filter.

The coefficient initialization technique used in the third application was based on the assumption that the activations generated by each input node was proportional to the signal at this input node divided by the sum of all input signals. The c coefficients were calculated as follows:

$$c_{1ij} = x_{im} \cdot e \cdot \sqrt{2} \cdot \left( x_{ij} / \sum_{j=1}^{n} x_{ij} \right) \quad (47)$$

where i=index assigned to the samples used in training,
j=index assigned to the input nodes,
$x_{ij}$=input signal applied to the jth input node as a part of the sample i,
$x_{mi}$=input signal applied to the 4th input node (middle node) as a part of the sample i,
e=percentage of the training achieved before training,
n=number of input nodes.

The c coefficients given above were used in all the cycles until training was completed.

In training the following seven sets of noise corrupted signals were applied to the input nodes:

| 0.1, | −0.05, | 0.2, | 0.05, | 0.3, | 0.15, | 0.4 | | | | | |
|---|---|---|---|---|---|---|---|---|---|---|---|
| | 0.05, | 0.2, | 0.05, | 0.3, | 0.15, | 0.4, | 0.15 | | | | |
| | | 0.2, | 0.05, | 0.3, | 0.15, | 0.4, | 0.15, | 0.3 | | | |
| | | | 0.05, | 0.3, | 0.15, | 0.4, | 0.15, | 0.3, | 0.05 | | |
| | | | | 0.3, | 0.15, | 0.4, | 0.15, | 0.3, | 0.05, | 0.2 | |
| | | | | | 0.15, | 0.4, | 0.15, | 0.3, | 0.05, | 0.2, | −0.05 |
| | | | | | | 0.4, | 0.15, | 0.3, | 0.05, | 0.2, | −0.05, 0.1 |

This corrupted signal was constructed using the following uncorrupted signal 0.0, 0.05, 0.1, 0.15, 0.2, 0.25, 0.3, 0.25, 0.3, 0.25, 0.2, 0.15, 0.1, 0.05, 0.0 and a noise signal of 0.1 and −0.1 consecutively.

In training a learning rate of 0.05 was used. The coefficient of the momentum term was 0.9. The training was terminated after 13 cycles when the mean squared error became $0.434 \cdot 10^{-6}$.

To recover the original signal we used only the first and second harmonics. In other words, in the testing program the constant term and the 3rd, 4th and 5th harmonics were set to zero. The following results were obtained in testing:

| Corrupted Signal | Recovered Signal | Original Signal |
|---|---|---|
| 0.05 | 0.152572 | 0.15 |
| 0.3 | 0.218342 | 0.2 |
| 0.15 | 0.239664 | 0.25 |
| 0.4 | 0.300000 | 0.3 |
| 0.15 | 0.239664 | 0.25 |
| 0.3 | 0.218342 | 0.2 |
| 0.05 | 0.152572 | 0.15 |

The recovered signals were multiplied by 26.04 to be able to compare them with the original signals.

In a similar way by only using the 5th harmonic and setting all other terms to zero we can recover the noise from the corrupted signal. The following results were obtained in testing:

| Corrupted Signal | Recovered Noise | Original Noise |
|---|---|---|
| 0.05 | 0.119425 | 0.1 |
| 0.3 | −0.101972 | −0.1 |
| 0.15 | 0.087625 | 0.1 |
| 0.4 | −0.100000 | −0.1 |
| 0.15 | 0.087625 | 0.1 |
| 0.3 | −0.101972 | −0.1 |
| 0.05 | 0.119425 | 0.1 |

The recovered signals were multiplied by 59.386 to be able to compare them with the original noise signals.

Note that when the noise signals are recovered, if so desired, they could be applied to the neural network described in the second application. This would be another way of recovering the uncorrupted signal.

We also removed the noise from the corrupted signal described previously without using the coefficient initialization technique. In a program designed for this purpose we used six harmonics in training, i.e., 13 sibling nodes per input node. The learning rate of 0.05 was used. The coefficient of the momentum term was 0.9. The training was terminated after 22 cycles when the mean squared error became $0.172 \cdot 10^{-6}$.

To recover the original signal we used the constant term, as well as, the first and second harmonics. In other words, in the testing program the 3rd, 4th, 5th and 6th harmonics were set to zero. The following results were obtained in testing:

| Corrupted Signal | Recovered Signal | Original Signal |
|---|---|---|
| 0.05 | 0.159600 | 0.15 |
| 0.3 | 0.225697 | 0.2 |
| 0.15 | 0.250099 | 0.25 |
| 0.4 | 0.300000 | 0.3 |
| 0.15 | 0.250099 | 0.25 |
| 0.3 | 0.225697 | 0.2 |
| 0.05 | 0.159600 | 0.15 |

The recovered signals were multiplied by 1.273 to be able to compare them with the original signals.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. An artificial neural network training architecture comprising:

source means for supplying at least one input data signal representing an input vector;

a plurality of input terminals connected to said source means;

an input multiplexer connected to each of said input terminals;

N arithmetic and storage units, representing N sibling nodes, connected to said input multiplexer;

N weight multiplier units connected to said N arithmetic and storage units;

wherein each arithmetic and storage unit generates a Fourier series using an input data signal received from said input terminal through said input multiplexer as a variable of the Fourier series, said Fourier series having as arguments of the sine and cosine terms said input data signal and not a probability distribution function of said input data signal, and supplies an output data signal from said arithmetic and storage unit to said weight multiplier units;

an adder unit connected to every one of said arithmetic and storage units through a plurality of said weight multiplier units;

a weight initializer connected to each of said weight multiplier units;

a weight changer connected to each of said weight multiplier units;

wherein output signals, representing synaptic link weight values from said weight changer and said weight initializer are stored in said adder unit;

an output multiplexer connected to said adder unit;

at least one output node connected to each of said N weight multipliers through said adder unit and through said output multiplexer for generating at least one activation at said output node;

means for connecting each said output node to a mid input terminal when said artificial neural network training architecture is performing as a lowpass, highpass, and bandpass filter;

means for applying to said output node, as a target value, a noise corrupted signal associated with a noise signal at each said mid input terminal when said artificial neural network training architecture is performing as an in-band filter;

a comparitor and error generator unit connected to said output node, and to said weight changer for generating an error measure signal when said activation is different from said signal at said output node;

means for indicating the completion of training when said error measure becomes equal to a preset value; and means for storing the synaptic link weight values of said weight multiplier units in a records file when training of said artificial neural network training architecture is completed.

2. The artificial neural network training architecture of claim 1, wherein said noise corrupted signal is sampled n consecutive times and applied in the form of a time series to said n input terminals, and further wherein a noise corrupted signal corresponding to a mid terminal sample appears at said output node when said artificial neural network is used as a lowpass, highpass, and bandpass filter.

3. The artificial neural network training architecture of claim 2, wherein an output signal of a first of N said arithmetic and storage units is independent of a corresponding input data signal and equals ($½^{0.5}$).

4. The artificial neural network architecture of claim 3 wherein the output signals of the remaining N–1 units of each set of N said arithmetic and storage units is dependent on the input data signal.

5. The artificial neural network architecture of claim 4, wherein training time of said artificial neural network training architecture, when used as an in-band filter, is reduced by said weight initializer by initially assigning said weight values to generate at said output node an activation equal to 90% to 97.5% of the signal at said output node for the first training cycle and setting the remaining (N–1) weights of each set of N said weight multiplier units to zero.

6. The artificial neural network architecture of claim 4, wherein training time of said artificial neural network training architecture, when used as a lowpass, highpass, and bandpass filter, is reduced by said weight initializer, by initially assigning said weight values to said weights of the first of each set of N said weight multiplier units between said arithmetic and storage units and said adder unit to generate at said output node an activation equal to 90% to 97.5% of the signal at said output node in every said cycle until said artificial neural network training architecture completes its training function, and setting for the first cycle the remaining (N–1) weights of each set of N said weight multiplier units to zero.

7. The artificial neural network training architecture of claim 1, wherein a noise signal is sampled n consecutive times, forming a set of n consecutive samples and applied in the form of a time series to said n input terminals, further wherein a set of noise corrupted signals corresponding to a mid terminal sample of each set of n input terminals is used as said target values of said output node when said artificial neural network training architecture is used as an in-band filter.

8. The artificial neural network architecture of claim 7, wherein the output of said comparitor and error generator unit is the difference between the noise corrupted signal at said output node and the activations generated by the noise signal applied to said input nodes.

9. The artificial neural network architecture of claim 8, wherein said error at the end of said training becomes approximately equal to said uncorrupted signal corresponding to the mid input terminal sample and said network runs in a continual training mode to remove said noise from said noise corrupted signal.

10. The artificial neural network architecture of claim 1, wherein said training architecture is carried out by simulation of hardware implementation of the artificial neural network on a computer.

11. An artificial neural network testing architecture comprising:

source means for supplying at least one input data signal representing an input vector;

a plurality of input terminals connected to said source means;

an input multiplexer connected to each of said input nodes;

N arithmetic and storage units, representing N sibling nodes, connected to said input multiplexer;

N weight multiplier units connected to said arithmetic and storage units;

wherein each arithmetic and storage unit generates a Fourier series using said input data signal receive from said input terminal through said input multiplexer as a variable of the Fourier series, said Fourier series having as arguments of the sine and cosine terms said input data signal and not a probability distribution function of said input data signal, and supplies an output data signal from said arithmetic and storage unit to said weight multiplier units;

wherein at least two arithmetic and storage units using the low frequency terms of the Fourier series are activated for use and all others are turned off when said network performs as a lowpass filter;

wherein at least two arithmetic and storage units using the high frequency terms of the Fourier series are activated for use and all others are turned off when said network performs as a highpass filter;

wherein at least two arithmetic and storage units using the mid-frequency terms of the Fourier series are activated for use and all others are turned off when said network performs as a bandpass filter;

an adder unit connected to every one of said arithmetic and storage units through a plurality of said weight multiplier units loaded from a records file of synaptic link weight values;

an output multiplexer connected to said adder unit;

a plurality of output nodes connected to said N weight multipliers through said adder unit and through said output multiplexer;

a competitor and error generator unit connected to said output nodes;

means for displaying the output of the adder unit as the system output when said artificial neural network is used as a lowpass, highpass, or bandpass filter; and means for displaying the output of the comparitor and error generator unit as the system output when said artificial neural network is used as an in-band filter.

* * * * *